United States Patent [19]

Melwisch et al.

[11] 4,308,550
[45] Dec. 29, 1981

[54] REPRODUCING APPARATUS WITH CROSS-TALK SUPPRESSION FOR A COLOR TELEVISION SIGNAL

[75] Inventors: Harald Melwisch; Dietfried Süss, both of Vienna, Austria

[73] Assignee: U.S. Philips Corporation, New York, N.Y.

[21] Appl. No.: 31,727

[22] Filed: Apr. 20, 1979

[30] Foreign Application Priority Data

May 17, 1978 [AT] Austria .................. 3571/78

[51] Int. Cl.³ ............................................ H04N 5/795
[52] U.S. Cl. ........................................ 358/8; 358/18; 358/4
[58] Field of Search .............. 358/8, 4, 11, 18, 31, 358/35; 360/26-28, 33

[56] References Cited

U.S. PATENT DOCUMENTS

| 3,461,226 | 8/1969 | Carnt | 358/8 |
| 3,504,111 | 3/1970 | Sumida | 358/8 |
| 3,681,518 | 8/1972 | Hidaka | 358/4 |
| 3,917,415 | 11/1975 | Eguchi | 358/11 |
| 3,939,485 | 2/1976 | Amari | 358/4 |
| 4,007,482 | 2/1977 | Amari | 358/4 |
| 4,007,484 | 2/1977 | Amari | 358/4 |
| 4,010,490 | 3/1977 | Ota | 358/8 |
| 4,134,126 | 1/1979 | Hirai | 358/8 |
| 4,209,800 | 6/1980 | Yamamitsu | 358/8 |

Primary Examiner—Alan Faber
Attorney, Agent, or Firm—Thomas A. Briody; William J. Streeter; Algy Tamoshunas

[57] ABSTRACT

In a reproducing apparatus for a color television signal recorded on a record carrier, of which at least the chrominance signal which contains the color synchronizing signals is recorded with periodically changed polarity in the individual line period sectors in at least one of two adjacent tracks, the polarity of the reproduced signal in the individual line period sectors is switched so by means of a polarity switching device that the polarity change effected during recording is cancelled, which enables cross-talk signals from an adjacent track to be suppressed. In order to ensure that the change in polarity during reproduction is always in synchronism with the change in polarity during recording, there is provided an identification circuit for the phase relationship between two such color synchronizing signals, which should be in phase in conformity with the television standard when the polarity change during reproduction exactly cancels the polarity change effected during recording. Thus, in the case of an incorrect polarity during reproduction this indentification circuit supplies a signal by means of which the switching state of the polarity switching device is each time changed by one switching step, until the polarity change during reproduction is again in synchronism with the polarity change during recording.

6 Claims, 8 Drawing Figures

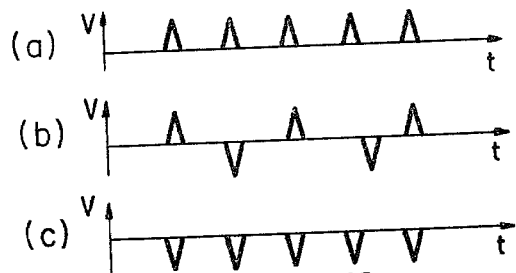
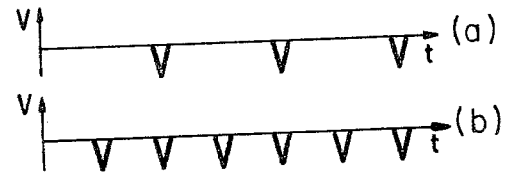
SIGNAL AT THE OUTPUT OF THE PHASE COMPARISON STAGE OF FIG. 2
FIG.2
FIG.5
SIGNAL AT THE OUTPUT OF THE PHASE COMPARISON STAGE OF FIG. 4
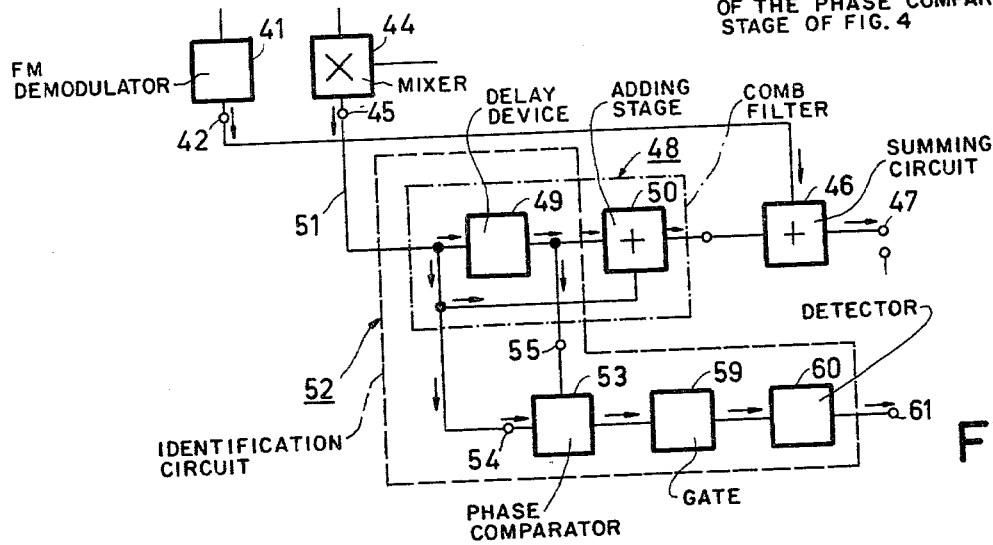
FIG.3
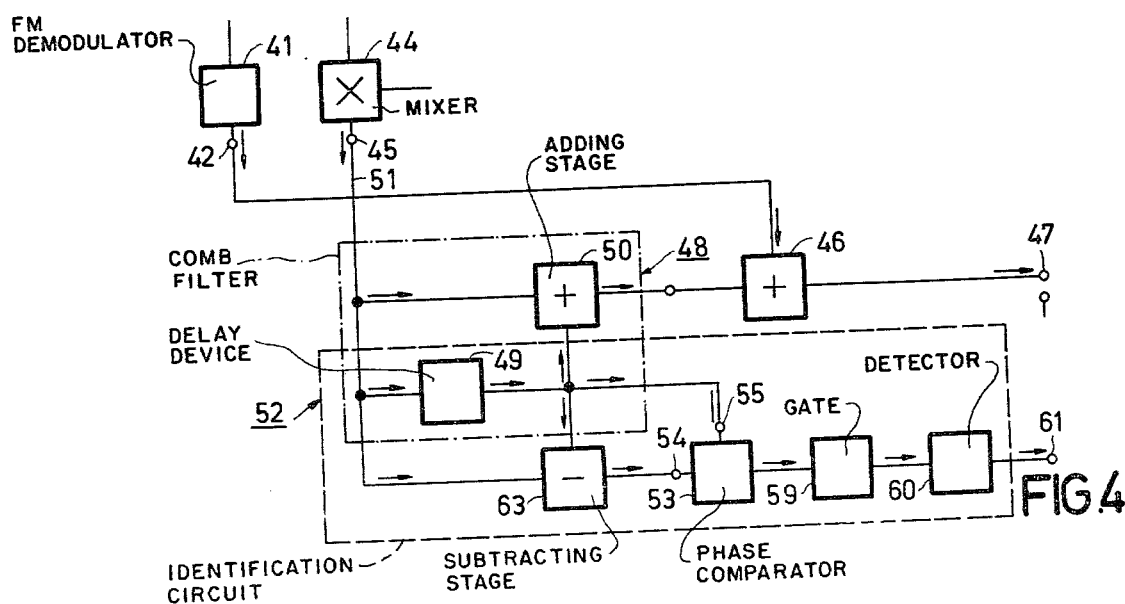
FIG.4

REPRODUCING APPARATUS WITH CROSS-TALK SUPPRESSION FOR A COLOR TELEVISION SIGNAL

The invention relates to a reproducing apparatus for a colour television signal recorded on a record carrier. In a system to which the present invention pertains, the individual line period sectors are aligned in adjoining tracks on the record carrier in a direction perpendicular to the tracks and at least the chrominance signal, modulated on a carrier wave and containing the colour synchronizing signals, is recorded with periodically changed polarity in those sectors in at least one of the two adjacent tracks. The reproducing apparatus comprises at least one device for switching the polarity of the reproduced signal in the individual line period sectors, whose switching condition is controlled in consecutive switching steps by a control device. To obtain the control quantity at least one signal of the line synchronizing frequency is applied to the control device and, the polarity is switched so as to cancel the polarity switching effected during recording. Such an apparatus is for example known from DE-OS No. 24 36 941 which corresponds to U.S. Pat. Nos. 4,007,482 and 4,007,484. In such apparatus it is essential that the polarity switching of the reproduced signal exactly cancels the polarity switching of the signal to be recorded performed during recording, because only in that case it is ensured that, for example by means of a comb filter, cross-talk between the signals reproduced from adjoining tracks can be eliminated.

It is an object of the invention, to indicate steps, which can be realized in a simple manner, ensuring that the switching of the polarity of the signal in the individual line period sectors to be affected during reproduction always takes place in the correct manner. To this end an apparatus of the type mentioned in the preamble, according to the invention, is provided with an identification circuit for the phase relationship between each time two colour synchronizing signals, which circuit is connected to the signal path which carries the reproduced signal of changed polarity and which includes a phase comparison stage, which on a first input receives the undelayed colour synchronizing signals and on a second input receives the colour synchronizing signals which have been delayed by a predetermined time interval with a delay means, said time interval being equal to the duration of one line period for a colour television signal in accordance with the NTSC standard and equal to the duration of two line periods for a colour television signal in accordance with the PAL standard, and whose output signal is applied to a detection device, which in the event of a difference in phase between the colour synchronizing signals which have been compared with each other supplies a signal by means of which the switching condition of the polarity switching device is changed by one switching step. In this way it is continuously ascertained whether the reproduced signal, whose polarity has been switched, is in compliance with a standard colour television signal in respect of the phase relationship of the colour synchronizing signals, as this was the case prior to the polarity switching to which the signal to be recorded was subjected during recording. Should this not be the case, the polarity switching is automatically changed until the colour synchronizing signals have the correct phase relationship with each other, after which it is guaranteed that the polarity switching during reproduction exactly cancels the polarity switching effected during recording.

It is found to be advantageous when the first input of the phase comparison stage is preceded by a subtractor stage, which receives both the undelayed colour synchronizing signals and the colour synchronizing signals which have been delayed with the delay means. In this way only colour synchronizing signals whose mutual phase relationship is not correct give rise to an output signal of the phase comparison stage, so that the detection of such an incorrect polarity switching becomes particularly simple and reliable.

In respect of a particularly simple construction it is found to be advantageous if in a reproducing apparatus, which comprises at least one comb filter for suppressing cross-talk between signals reproduced from adjacent tracks, which filter is included after the polarity switching device and comprises a delay means, the delay means of the comb filter is at the same time used as delay means for the identification circuit. In this way only one delay means is required in total.

The invention will now be described in more detail with reference to the drawings, which show some embodiments of the invention, to which the invention is not limited.

FIGS. 2a to 2c shows diagrams of different groups of signals obtained after the phase comparison stage provided in the embodiment of FIG. 1.

FIG. 3 shows the essential parts of a modification of the embodiment of FIG. 1, comprising only one delay means.

FIG. 4 shows a modification of the embodiment of FIG. 3, the phase comparison stage being preceded by a subtractor stage.

Figure 1:
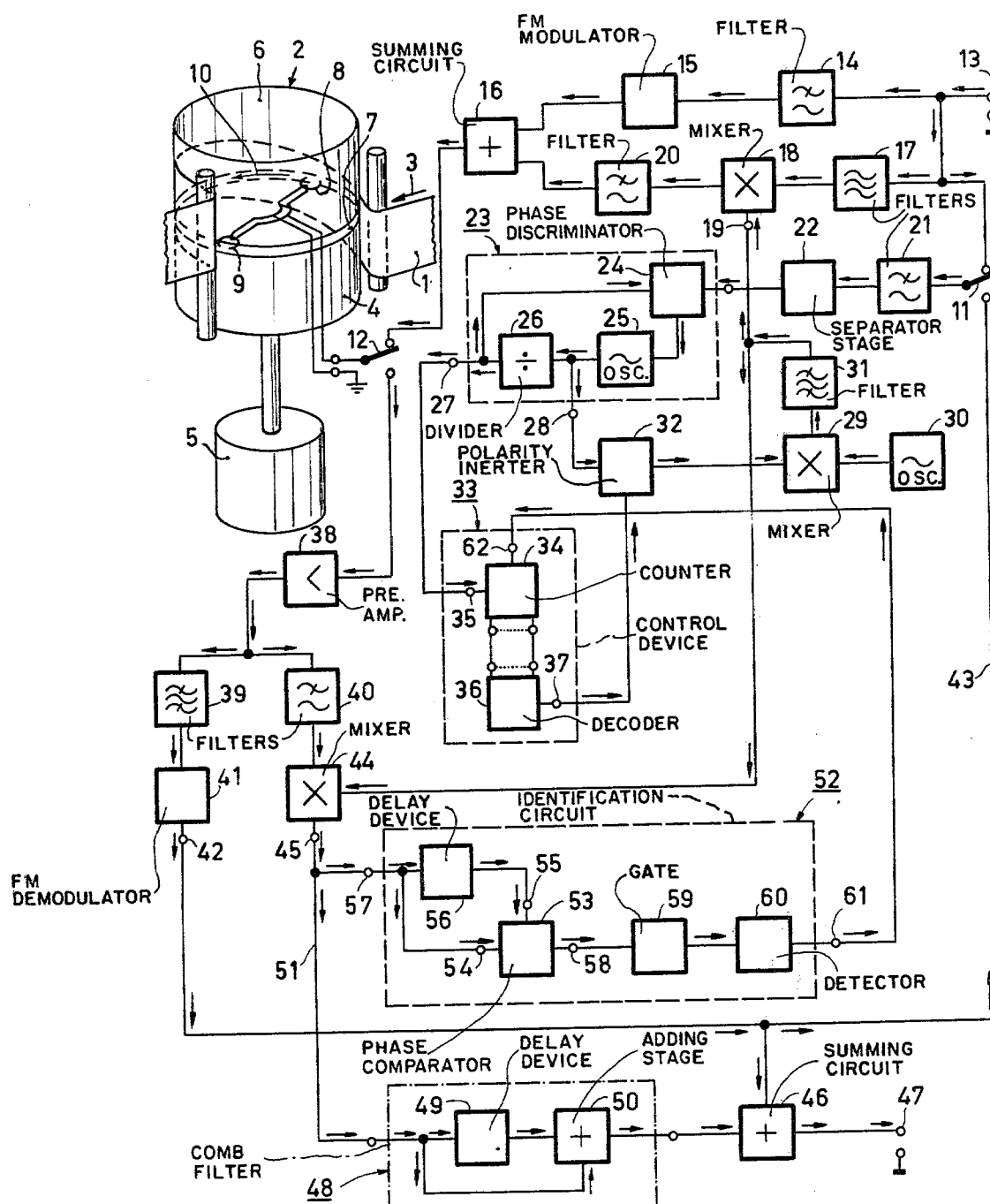
FIG. 1 is a block diagram of the parts, which are essential for the invention, of a recording and/or reproducing apparatus for a colour television signal, in which the polarity of the chrominance signal is switched.

FIGS. 5a and 5b again shows a diagram of different groups of signals obtained after the phase comparison stage of FIG. 4.

The embodiment of FIG. 1 shows an apparatus for magnetically recording and/or reproducing a colour television signal in accordance with the so-called helical scan method. In such an apparatus a record carrier 1, in the form of a tape, is passed over the peripheral surface of a drum 2 in a helical path through a 180° angle. The record carrier is then moved in the direction of the arrow 3. The drum 2 consists of a stationary section 4 and a section 6 which is rotatable by a motor 5. The two sections form a gap 7 therebetween, from which project two magnetic heads 8 and 9 arranged diametrically opposite each other and mounted on the rotatable drum section 6. The direction of rotation of the drum section 6 and, thus of the magnetic heads 8 and 9, is anti-clockwise in accordance with the arrow 10. In this way, the magnetic heads 8 and 9 consecutively scan adjacent oblique tracks on the record carrier. The selected system parameters, such as speed of the record carrier, number of revolutions of the magnetic heads, the drum diameter and the manner in which the record carrier is passed around said drum, ensure in known manner that in each track one field is recorded and that the individual line period sectors are aligned relative to each other in a direction perpendicular to the tracks.

Switching the apparatus to recording or playback is effected by means of two switches 11 and 12, which are shown in the RECORDING mode in FIG. 1. The colour television signal to be recorded, in the present instance a PAL signal in accordance with the European standard, is applied to the terminal 13. From there the signal is fed to three signal paths. In one of these paths this signal is applied to a low-pass filter 14, on whose output appears the luminance signal together with the synchronizing pulses. The output of filter 14 is applied to an FM-modulator 15 in the usual manner, which converts the signal into a frequency modulation signal suitable for magnetic recording. The converted signal is then applied to the input of a summing circuit 16, whose output is connected to the magnetic heads 8 and 9 via switch 12. In a second signal path, the colour television signal from the terminal 13 is applied to a band-pass filter 17 which supplies at its output the chrominance signal consisting of a carrier having a frequency of 4.43 MHz, on which colour difference signals together with the colour synchronizing signals are quadrature modulated. This chrominance signal arrives at a mixing stage 18, which receives at an input 19 a subcarrier having a frequency of 5.055 MHz, so that on the output of the mixing stage a signal with a carrier having a frequency of 625 kHz is obtained, which is then used for magnetic recording in the usual manner. This signal at the output of the mixing stage 18 is applied to a further input of the summing circuit 16 via a low-pass filter 20, so that it also reaches the magnetic heads 8 and 9 via the switch 12. The third signal path, which begins at the terminal 13, serves for recovering the synchronizing pulses. This path leads via switch 11 from the terminal 13 to a low-pass filter 21 to which is connected a separator stage 22 for the synchronizing pulses. The output signal of this separator stage is applied to a flywheel circuit 23 in the usual manner. Circuit 23 comprises a phase discriminator 24 which controls an oscillator 25 with a frequency of 625 kHz, whose output signal is applied to a divider stage 26, which divides the frequency of the oscillator signal by a factor 40, so that at its output a signal with the frequency of the line synchronizing pulses i.e. 15,625 Hz, is available, which is also applied to the phase discriminator 24 and which also appears on an output 27 of the flywheel circuit 23. The signal from the controlled oscillator 25, furthermore, reaches a further output 28 of the flywheel circuit 23, from which it is applied to a mixing stage 29, which also receives the signal from an oscillator 30, which operates with a frequency of 4.43 MHz, so that the mixing stage supplies the desired signal for the subcarrier with a frequency of 5.055 MHz, which via a band-pass filter 31 arrives at the input 19 of the mixing stage 18.

In the present embodiment only the polarity of the chrominance signal quadrature-modulated on a 625 KHz carrier, which signal for the sake of simplicity is referred to hereinafter as chrominance signal, is suitably switched during the line periods. This polarity switching is effected in such a way that in all tracks the polarity of the chrominance signal in the line periods is switched in periodically recurring groups with the same pattern of consecutive polarities. The groups comprise at least four line periods with the groups in adjacent tracks being offset by at least one line period relative to each other, and extending over the adjoining tracks without interruption of the pattern. Because in the present example the chrominance signal is one in conformity with the PAL standard, for the polarity switching it is assumed that the polarity of the chrominance signal is not changed during four line periods and is switched during the next four line periods, the groups with the same pattern of consecutive polarities, which in the present case comprise eight line periods, being offset by two line periods relative to each other in adjoining tracks.

For the formation of the said pattern for the polarity switching of the chrominance signal there is provided a device for switching the polarity of said signal in the relevant line periods. The switching device is controlled by a control device to which a signal of line synchronizing frequency is applied to obtain the control quantity. For this purpose there is provided a polarity inverter 32, which transfers the signal applied to it with either a 0° or a 180° phase shift. In the present example polarity reversal is effected by means of the subcarrier frequency supplied by the mixing stage 29, for which purpose the polarity inverter 32 is included between the output 28 of the flywheel circuit 23 and the relevant input of the mixing stage 29. The inverter accordingly influences the phase of the signal supplied by the oscillator 25, so that the phase of the 5.055 MHz subcarrier is influenced, which is applied to the input 19 of the mixing stage 18, as a result of which finally the 625 KHz carrier on which the chrominance signal, supplied by the mixing stage 18, is quadrature-modulated is accordingly shifted in phase either by 0° or 180°.

For controlling the polarity inverter 32 there is provided a control device 33 comprising a counter 34, which at its input 35 receives the signal of line synchronizing frequency available at the output 27 of the flywheel circuit. This counter has a number of counter positions equal to the number of line periods in one group, so that in this case it has eight counter positions and accordingly counts continuously from one to eight in the rhythm of the line synchronizing frequency, the instantaneous count appearing at the eight outputs of the counter. Connected to the eight outputs of counter 34 is a decoding device 36 which controls the polarity inverter 32. This decoding device is programmed in accordance with the pattern of consecutive polarities in a group, so that depending on the count it supplies a signal when the polarity is to be changed. Therefore, in this case, the decoding device 36 is programmed so that it supplies a pulse on its output 37 each time that the count five, six, seven and eight is reached. Thus the pattern +, +, +, +, −, −, −, −, is formed, the + sign denoting a non-inverted and the − sign an inverted signal. To this end, the output 37 of the decoding device 36 is connected to a corresponding input of the polarity inverter 32, so that the switching condition of the inverter is changed during the consecutive switching cycles, as dictated by the decoding device 36.

Thus, in all tracks the polarities of the chrominance signal in the relevant line periods are switched in periodically recurring groups with the same pattern of consecutive polarities, the groups extending continuously over the adjacent tracks without interruption of the pattern.

For the reproduction of signals recorded in this manner, the switches 11 and 12 are changed over. The signals, scanned by the magnetic heads 8 and 9, are then applied to a preamplifier 38 via the switch 12. From the preamplifier the signals are applied both to a band-pass filter 39 and to a low-pass filter 40. With the aid of the band-pass filter 39 the luminance signal is filtered out and is subsequently applied to an FM demodulator 41, on whose output the demodulated luminance signal is available. This signal, which also comprises the synchronizing pulses, reaches the switch 11 via the line 43, which switch applies it again to the synchronizing pulse separator stage 22, which in turn feeds the flywheel circuit 23, so that during reproduction a signal with the line synchronizing frequency is also available on the output 27 and a signal with a frequency of 625 KHz on output 28. The last-mentioned signal again reaches the mixing stage 29, which moreover receives the signal from the oscillator 30, so that the subcarrier with a frequency of 5.055 MHz is again available on its output. With the aid of the low-pass filter 40, the chrominance signal, which is quadrature-modulated on a 625 KHz carrier, is extracted from the reproduced signal and subsequently applied to a mixing stage 44, which furthermore receives the 5.055 MHz subcarrier via the band-pass filter 31, so that on its output 45 the chrominance signal, which also contains the colour synchronizing signals, is available modulated on a 4.43 MHz carrier. The luminance signal from the FM demodulator 41 and the chrominance signal from the mixing stage 44 are recombined in a summing circuit 46, so that the complete reproduced colour television signal is available on the output 47 of the summing circuit 46.

During reproduction the change in polarity of the chrominance signal in the relevant line periods, which has been introduced in all tracks during recording, is cancelled. This is effected in a similar way as during recording with the aid of the polarity inverter 32. During reproduction inverter 32 also changes the polarity of the signal from the oscillator 25, obtained from the output 28 of the flywheel circuit 23, so that this polarity change is also impressed on the subcarrier obtained from the mixing stage 29. This in turn causes a change in polarity of the chrominance signal in the mixing stage 44. These polarity changes are again controlled by the control device 33, whose decoding device 36 each time that the counter 34 reaches the counts five, six, seven and eight influences the switching condition of the polarity inverter 32 in a corresponding succession of switching cycles, so that this polarity switching again follows the pattern +, +, +, +, −, −, −, −. In this way the reproduced useful signal scanned from the relevant track is restored to and continuously exhibits the original polarity.

If during reproduction there is cross-talk from chrominance signals recorded in an adjacent track, their polarity will be changed in the same rhythm as the useful signal. However, since the groups and thus the patterns in adjacent tracks are offset from each other by two line periods, it follows that the cross-talk signal is not restored to its original polarity, but has a different polarity after the polarity switching, namely with the sequence −, −, −, +, +, if that polarity in an adjacent track is reversed which adjoins a negative polarity in the track just scanned. However, this means that the mean frequency of the cross-talk component of the chrominance signal after reproduction and polarity inversion changes, namely by a quarter of the line frequency, so that the maxima in the frequency spectrum are shifted, namely by a quarter of the line frequency, relative to the maxima in the frequency spectrum of the chrominance signal in the useful signal, which follow each other with half the line frequency. As a result of this the two signals have frequency spectrums which are interleaved relative to each other. This enables the crosstalk component to be filtered out of the useful signal. In the present example this is effected by means of a comb filter. Therefore, as is shown in FIG. 1, the mixing stage 44 is followed by a comb filter 48, whose output signal is then applied to the summing circuit 46.

Such a comb filter typically comprises a delay means 49, which is followed by an adding stage 50 which also receives the signals supplied to the input of the delay means. The time interval by which the delay means should delay the signal applied to it should be selected in accordance with the interlacing of the frequency spectra of the useful signal and the cross-talk signal. In the present example the signal is delayed by a time interval of two line periods, so that on the output of the adding stage a useful signal is available which is largely exempt from cross-talk.

Obviously, it is also possible to switch the polarity of the luminance signal during recording. In this respect it is to be noted that for the suppression of the cross-talk signal it is not absolutely necessary to provide a comb filter, in particular, if only weak cross-talk signals are present. Because the cross-talk signals are frequently shifted relative to the useful signals, the cross-talk signal is optically suppressed on the picture screen in known manner. Alternatively, it would be possible to change the polarity of the chrominance signal in a manner other than via the subcarrier. For example, the polarity of the carrier on which the chrominance signal is modulated may be inverted directly, in which case the polarity inverter should be included before or after the mixing stage 18 or 44 respectively.

If during reproduction the polarity of the chrominance signal is not switched in synchronism with that during recording, the cross-talk signal will no longer have an alternating polarity in the sequence −, −, +, +. This means that there will be no corresponding interlacing of the frequency spectra of the useful signal and the cross-talk signal. As a result, the cross-talk signal can no longer be suppressed relative to the useful signal. Therefore, steps should be taken to ensure that the polarity switching during reproduction exactly cancels the polarity switching effected during recording.

For this purpose there is provided an identification circuit 52 for the phase relationship between two colour synchronizing signals. Circuit 52 is connected to the signal path 51, which begins at the output 45 of the mixing stage 44 and which carries the reproduced signal whose polarity has been switched. If the phase relationship of the colour synchronizing signals which have been compared with each other is not the same, circuit 52 supplies a signal by means of which the switching condition of the polarity-switching device 32 or 33, respectively, is changed by one switching step. Because they are contained in the chrominance signal, the colour synchronizing signals are subject to the same polarity switching sequence as the chrominance signal itself, both during recording and during reproduction. It is, therefore, possible to ascertain from the phase relationship of the reproduced colour synchronizing signals, whose polarity has been switched, whether the polarity change during reproduction has exactly cancelled the polarity change during recording, because in this case the relevant colour synchronizing signals should have a mutual phase relationship in accordance with the relevant television standard. For a colour television signal in accordance with the PAL standard, as is known, the colour synchronizing signals should have the same phase every two line periods, while for a colour television signal in accordance with the NTSC standard the colour synchronizing signals should have the same phase in line periods which follow each other directly, i.e. in all line periods. Therefore, for colour television signals in accordance with the PAL standard the identification circuit 52 should compare the colour synchronizing signals of every second line period with each other and for colour television signals in accordance with the NTSC standard this should be effected for the consecutive line periods. If the polarity change during reproduction does not cancel the polarity change during recording, a 180° phase shift will occur between the colour synchronizing signals being compared. The phase shift may then be detected and used for correcting the polarity sequence during reproduction.

For this purpose, the identification circuit 52 comprises a phase comparison stage 53, which at a first input 54 receives the colour synchronizing signals without delay and at a second input 55 with a predetermined delay obtained by means of a delay device 56. From the foregoing it will be apparent that the delay should be equal to the duration of two line periods for a colour-television signal in accordance with the PAL standard, and equal to the duration of one line period for a colour television signal in accordance with the NTSC standard. In the present embodiment the input 57 of the identification circuit 52 is connected directly to the signal path 51, so that at its inputs 54 and 55 the phase comparator stage 53 receives the chrominance signals, which contain the colour synchronizing signals. In order to ensure that the identification circuit only determines the phase relationship between the relevant colour synchronizing signals, a gate circuit 59 is connected to the output 58 of the phase comparison stage, which gate circuit is open only during the interval that the colour synchronizing signals appear. If desired, the gate circuit 59 in the present embodiment may also precede the input 57 of the identification circuit 52, so that only the colour synchronizing signals can reach the identification circuit.

FIG. 2a shows the output signal of the phase comparison stage 53 after the gate circuit 59 in the case that the change in polarity during reproduction is effected correctly and thus exactly cancels the change in polarity during recording. It is evident that in this case, as a result of the phase equality of the colour synchronizing signals which have been compared with each other, only pulses of the same, for example positive, polarity follow each other at time intervals corresponding to the appearance of the colour synchronizing signals. FIGS. 2a and 2b by way of example, show the signal sequence occurring after the gate circuit 59, which occurs if the polarity change during reproduction is not effected correctly, i.e. not in synchronism with the polarity change during recording. FIG. 2b represents a case where in each second line period the polarity change during reproduction is correct, whilst it is incorrect in the line periods between them. When the polarities are changed correctly positive pulses appear again, whilst if it is incorrect, in which cases the colour synchronizing signals which have been compared with each other are 180° phase shifted relative to each other, pulses appear which have a polarity which is opposed to that of the first mentioned pulses, i.e. in this case negative pulses. FIG. 2c represents a case where in all line periods the polarity change during reproduction is not correct, so that then only negative pulses appear. The resultant signal sequence of positive or negative pulses thus indicates whether the polarity change during reproduction in the relevant line period is correct or incorrect.

In order to detect the outut signals of the phase comparison stage 53 a detection device 60 is included after the gate circuit 59. Device 60 detects those pulses of corresponding polarity, produced by two compared colour synchronizing signals of opposite phase. Thus, in the present case the pulses of negative polarity are detected.

Thus, at the output of the detection device 60, which also constitutes the output 61 of the identification circuit 52, a signal is available by means of which the polarity switching sequence during reproduction can be influenced. In the present example this is effected in such a way that upon the appearance of an output signal of the identification circuit 52 the counter 34 of the control device 33 for the polarity inverter 32 is influenced so that its count is each time reduced by one. For this purpose the output 61 of the identification circuit 52 is connected to a reset input 62 of the counter 34. If in the present case the detection device 60 detects a negative pulse on the output of the gate circuit 59, the counter 34 is constantly set one counting step backwards, which, via the decoding device 36, is transferred to the polarity inverter 32, so that its switching condition is changed by one switching step in deviation from the fixed switching sequence, as a result of which necessarily the same polarity + or − occurs in two consecutive line periods, after which the polarity switching pattern continues. As soon as the detection device 60 again detects a negative pulse on the output of gate circuit 59, this process is repeated. In this way the counter 34 is influenced until the polarity sequence during reproduction is again in synchronism with the polarity during recording. Obviously, it is then also possible to influence the counter 34 in such a way that its counter is not reduced by one but increased by one. Similarly, it is alternatively possible to influence the polarity inverter 32 directly by the output signal of the identification circuit 52 instead of the counter 34.

In this way it is ensured that the polarity change of the chrominance signal during reproduction is in synchronism with the polarity change during recording, so that cross-talk between adjacent tracks can be eliminated continuously.

As is apparent from the foregoing, the time interval by which the delay means 49 of the comb filter 48 should delay the chrominance signal applied to it, is equal to the time interval by which the delay device 56 of the identification circuit 52 should delay the chrominance signal, which both applies to a colour television signal in accordance with the PAL standard and one in accordance with the NTSC standard. Therefore, in a modification of the embodiment of FIG. 1, the same delay device 49 has been provided for the comb filter 48 and the identification circuit 52, as is shown, which is FIG. 3 in a detail of a block diagram corresponding to that of FIG. 1. The output signal of the delay device 49 is then applied both to the summing circuit 50 of the comb filter 48 and to the input 55 of the phase comparison stage 53 of the identification circuit 52. The circuit is otherwise similar in construction and operation to that of FIG. 1. Therefore such an arrangement, which requires only one delay device, is particularly simple.

In the embodiment of FIG. 4, in the same way as in the embodiment of FIG. 3, the same delay device 49 is provided for the comb filter 48 and the identification circuit 52. However, the input 54 of the phase comparison stage 53 is preceded by a subtractor stage 63, which receives both the undelayed colour synchronizing signals and the colour synchronizing signals which have been delayed by the delay device 49, again in the form of the complete chrominance signal which contains the colour synchronizing signals. In this way signals of the same phase cancel each other in the subtractor stage 63, so that in this case no signal is applied to the input 54 of the phase comparison stage 53. Thus only in the case that the signals are in phase opposition will a corresponding signal be transferred to the input 54 of the phase comparison stage 53. However, this means that in the case of a correct polarity during reproduction the phase comparison stage 53 or the gate circuit 59 supply no signals at all to the detection device 60. Only if the polarity during reproduction is not correct, pulses of a specific polarity, for example again the negative polarity, will be supplied from the output of the gate circuit 59 to the detection device 60 as a result of the actuation of the phase comparator stage 53.

FIG. 5 by way of example shows two such signal sequences appearing after the gate circuit 59. The signal sequence shown in FIG. 5a represents the same polarity error as the signal sequence shown in FIG. 2b. Similarly, the signal sequence shown in FIG. 5b, represents the same polarity as the signal sequence of FIG. 2c. As can be seen, only in the case of an error in the polarity switching sequence will pulses of one polarity occur in the output signal of the phase comparison stage 53 to the gate circuit 59. Thus, the detection device 60 should only be capable of discriminating between no input signal, corresponding to a correct polarity sequence during reproduction, and the occurrence of pulses of one polarity, corresponding to an incorrect polarity during reproduction, which adds to the reliability of the detection device and the simplicity of the arrangement.

It is obvious that the steps described in the foregoing may also be applied to other recording and/or reproducing systems, which for the suppression of cross-talk from an adjacent track both during recording and during reproduction employ a specific polarity switching sequence for at least the chrominance signal which contains the color synchronizing signals. This may concern systems with spiral tracks on a disc-shaped record carrier or with tracks which extend in the longitudinal direction of a record carrier in the form of a tape. Thus, there is no limitation to magnetically recorded or reproduced signals, but all types of recording and/or reproducing systems may be involved, such as for example optical systems, in which cross-talk between adjacent tracks may occur. Similarly the present steps may be used independently of the selected type of polarity switching sequence or pattern of switching the polarity in the individual line periods and how these patterns extend over the tracks. As an example there may be provided a phase jump in the pattern of the polarity switching sequence at the transition from one track to the next track or only one periodic polarity reversal may be applied in every second track.

What is claimed is:

1. In an apparatus for reproducing a color television signal, including a chrominance signal containing color synchronizing signals, recorded on a plurality of tracks on a record carrier such that individual line period sectors are aligned in adjacent tracks in a direction perpendicular to the direction of the tracks and wherein the polarity of at least the chrominance signal is recorded with periodically changed polarity in said sectors in at least one of two adjacent tracks, said apparatus having means for periodically switching the polarity of the reproduced signal in predetermined line period sectors, means responsive to a line synchronizing frequency signal and coupled to said switching means for controlling the switching period thereof so as to cancel the polarity switching effected during recording, the improvement comprising means for identifying the phase relationship between color synchronizing signals of predetermined line period sectors and means for applying said reproduced signal with said switched polarity to said identifying means, said identifying means including means for delaying said color synchronizing signals for a predetermined time interval, means coupled to said delay means for comparing the phase of said delayed color synchronizing signals with the phase of undelayed color synchronizing signals and means coupled to said phase comparison means for applying to said control means a control signal in the event the phase between said delayed and undelayed synchronizing signals differ from that prescribed by a predetermined format, said control means in response to said control signal modifying the polarity switching effected by said switching means so that said phase difference conforms to said format.

2. The apparatus according to claim 1 wherein said switching means switches the polarity of said synchronizing signals in consecutive steps and wherein, in response to said control signal, the switching condition of said switching means is changed by one switching step.

3. The apparatus according to claims 1 or 2 wherein said format is the NTSC standard, said synchronizing signals are delayed by said delay means for a time interval equal to one line period interval and said control signal producing means produces a control signal in the event of a difference in phase between said delayed and undelayed synchronizing signals compared by said comparing means.

4. The apparatus according to claims 1 or 2 wherein said format is the PAL standard, said synchronizing signals are delayed by said delay means for a time interval equal to the duration of two line periods and said control signal producing means produces a control signal in the event of a difference in phase between said delayed and undelayed synchronizing signals compared by said comparing means.

5. The apparatus according to claim 1 including a subtractor stage having a first input coupled to said delay means for receiving said delayed synchronizing signals, a second input for receiving said undelayed synchronizing signals and an output coupled to said comparing means.

6. The apparatus according to claim 1 or 5 including a comb filter for suppressing cross-talk between signals reproduced from adjacent tracks and wherein said delay means supplies delayed signals to said comb filter.

* * * * *

UNITED STATES PATENT AND TRADEMARK OFFICE
CERTIFICATE OF CORRECTION

PATENT NO. : 4,308,550
DATED : December 29, 1981
INVENTOR(S) : Harald Melwisch and Dietfried Süss It is certified that error appears in the above—identified patent and that said Letters Patent is hereby corrected as shown below:

Column 10, line 29, claim 1, change "differ" to --differs--.

Signed and Sealed this

Thirtieth Day of November 1982

[SEAL]

Attest:

GERALD J. MOSSINGHOFF

Attesting Officer    Commissioner of Patents and Trademarks